Oct. 29, 1929.   F. W. BAKER   1,733,771
FLEXIBLE DRIVING MECHANISM
Filed Jan. 21, 1928   2 Sheets-Sheet 1
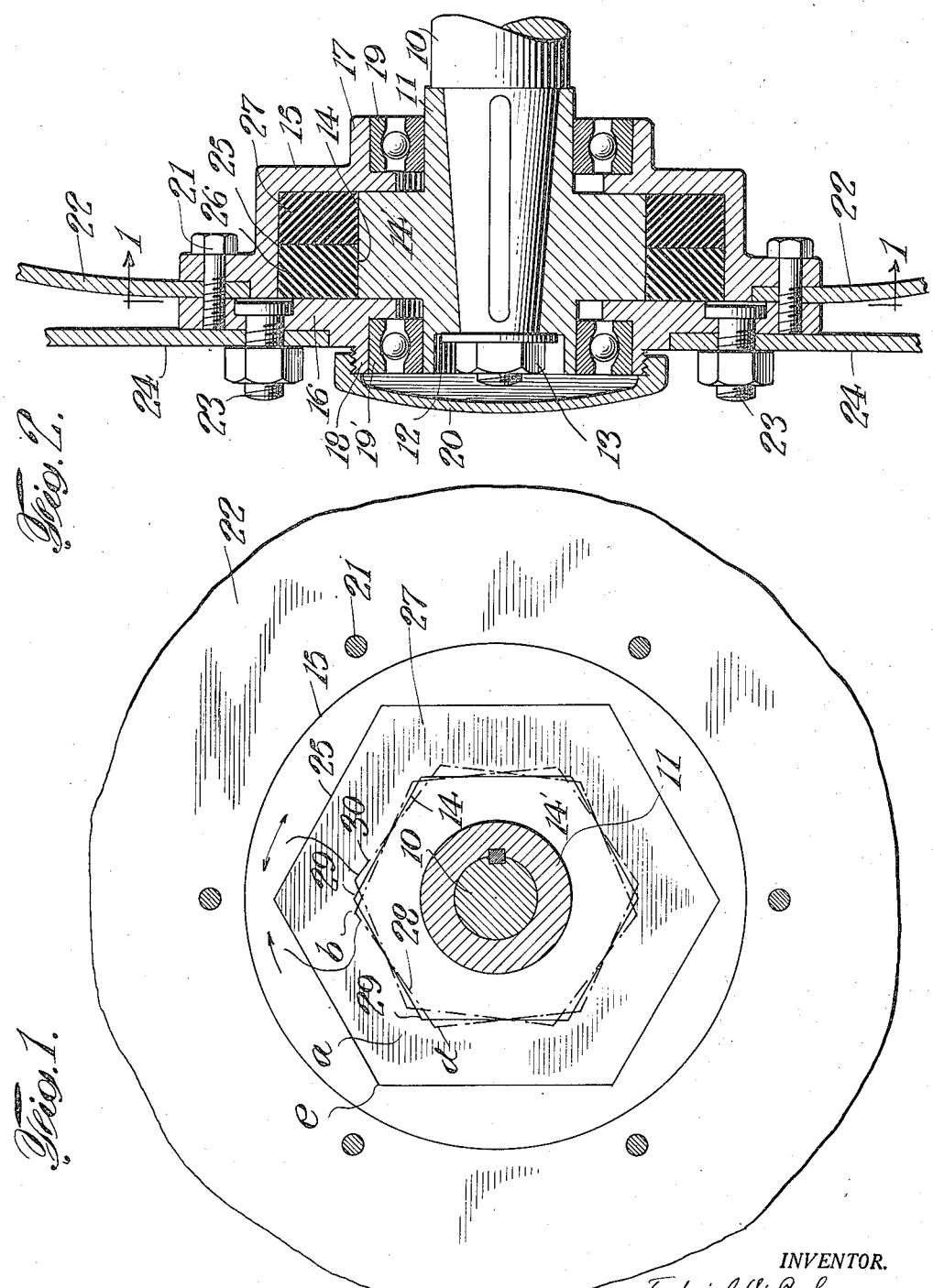
INVENTOR.
Frederick W. Baker,
BY
Hoguet & Neary,
ATTORNEYS.

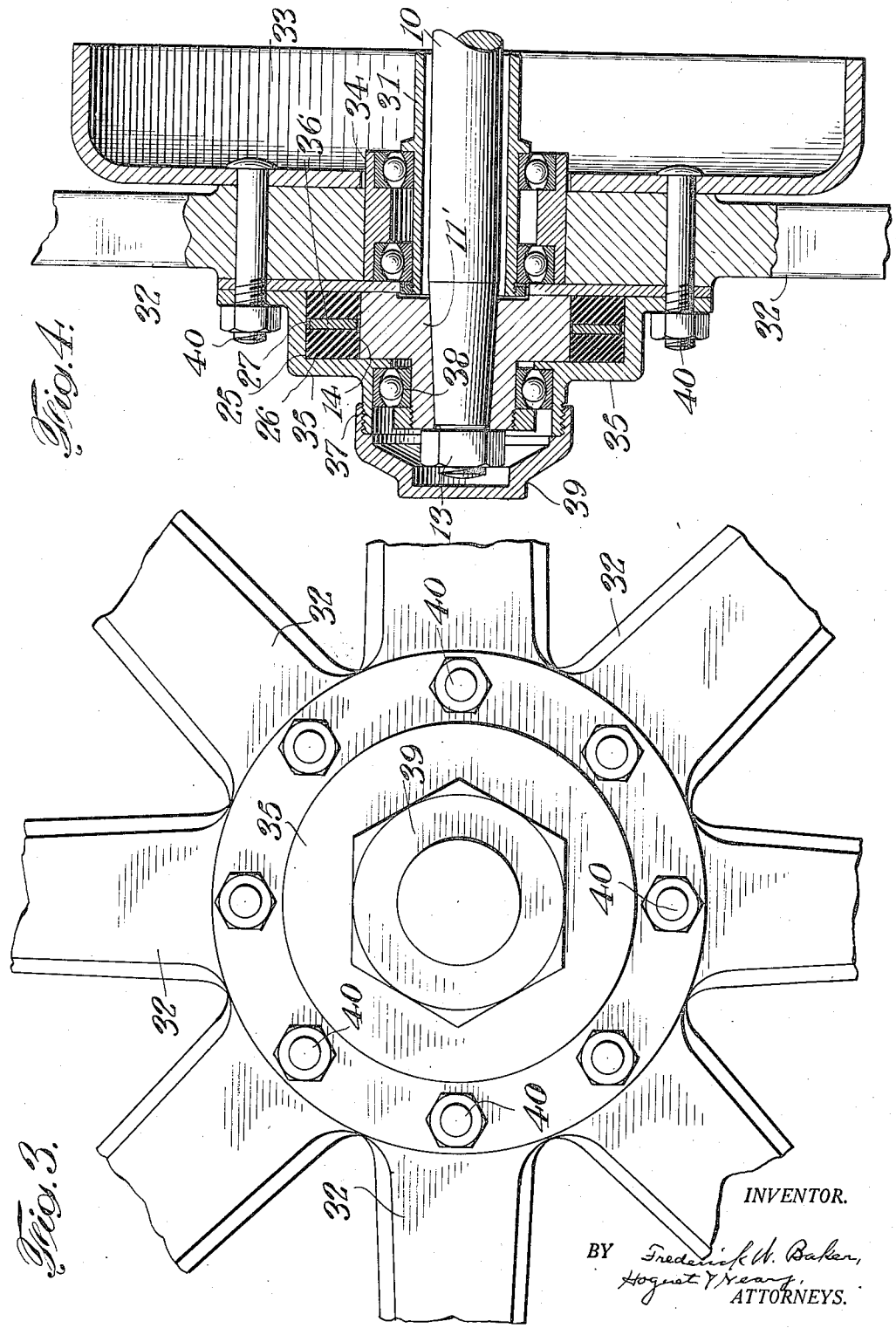

Patented Oct. 29, 1929

1,733,771

UNITED STATES PATENT OFFICE

FREDERICK WILLIAM BAKER, OF STOURBRIDGE, ENGLAND, ASSIGNOR TO TRINITY WHEEL CORPORATION, OF NEW YORK, N. Y., A CORPORATION OF NEW YORK

FLEXIBLE DRIVING MECHANISM

Application filed January 21, 1928. Serial No. 248,510.

My invention relates to improvements in flexible driving mechanisms in which the driving and driven members are spaced apart, and the driving effort from one to the other is transmitted wholly through a non-metallic resilient mass interposed between the driving and driven members. The invention is especially applicable to the wheels of motor cars, and can be most conveniently incorporated in the hub member of a wheel, and when thus applied the invention is intended to relieve the shocks and strains incident to the starting of the car. It follows that the structure of the invention can be applied to wheels or rotary members of any kind in which it is desired to relieve the starting strains. My invention is intended further to confine the medium between the driving and driven members so that it will not be distorted, and to dispose the said medium so that the first driving effort or strain will be taken up by the said resilient medium, and then the movement gradually and increasingly transmitted to the driven member, so that the structure acts in the nature of a change speed as well as resilient drive, because when the maximum compression of the driving medium is reached, then the motion will be constant, and likewise the applied power.

My invention is further intended to produce a structure of this kind in which the driving and driven members have opposed seats which co-act, and in which the driving medium is non-metallic and fills the entire space between the driving and driven members so that the driving seats will act as an abutment against the corresponding parts of the driving medium, and this acting against the corresponding seats of the driven member will impart rotary motion to said driven member. In this way I get a simple construction which permits the driving medium to be easily applied and renewed, and in which the driving medium is quiet and works without any rattling of the connected parts. My invention is intended also to produce a structure which can be applied readily to conventional wheel parts, and which in many instances can be very easily applied to existing wheels in the form of a unitary hub.

These and other advantages will more fully appear from the description which follows.

Reference is to be had to the accompanying drawings forming a part of this specification, in which similar reference characters indicate corresponding parts in all the views.

Figure 1 is a sectional elevation of my invention on the line 1—1 of Figure 2, looking in the direction of the arrows and showing the driving mechanism in hub form as applied to a wheel.

Figure 2 is an axial section of the structure shown in Figure 1.

Figure 3 is a broken elevation of the invention as applied to another type of wheel with a full floating axle, and Figure 4 is an axial section of the structure shown in Figure 3.

As the most usual application of my flexible drive is to a car wheel, I have shown the driving member as moved by an axle 10 having a sleeve portion 11 keyed thereto which is recessed at its outer end as shown at 12 to receive a fastening nut 13 on the reduced outer end of the axle. The foregoing parts are all conventional. The sleeve 11 has an enlarged middle portion 14' around which are flat seats or facets 14 so that this part of the driving member is in the form illustrated hexagonal, but obviously there can be more or less of these seats 14, and while the flat shape is the preferred one, they can be given other configurations if desired. The parts 10, 11 and 14' comprise the essential parts of the driving member, and the central seats 14 co-act with corresponding seats of the driven member, which consists essentially of the cap housing 15 and its complementary part 16, which are clamped together as hereinafter described, and enclose the resilient driving medium which will also be fully described later.

The driven member is spaced from the driving member by bearings 19 and 19' which are shown as ball bearings, and which in any event are easy running bearings, and are spaced on opposite sides of the part 14' so as to prevent the driven member from wobbling. These bearings are shown between the sleeve 11 and the annular flanges 17 and 18 on the driven member, the latter flange 18 being shown as screw threaded exteriorly to permit connection with a conventional cap nut 20. The parts 15 and 16 are connected by bolts 21 or equivalent fastenings which also are illustrated as holding in place a brake drum 22, while other fastenings 23 secure the driven member to the wheel disc 24. It is apparent that the driven member can be applied to any other rotary part in any approved way, and the foregoing connection with a disc wheel and drum is simply to illustrate one use of the structure.

The inner part of the housing 15 opposite the seats 14 is formed with similar seats 25 which serve as abutments as do the seats 14, and the seats 25 are spaced apart from and radially opposite the seats 14. The intervening space between the seats 14 and 25 is filled by the resilient driving medium, and I have shown two of these members 26 and 27, each in the form of a resilient collar which can be forced into place between the inner and outer seats 14 and 25. This arrangement makes it easy to renew the driving medium when it becomes worn.

I have shown two of these members 26 and 27 adapted for use in starting the driven member in opposite directions, and it will be understood that the structure would work with one member, although a plurality is desirable, and that a greater number of alternating driving mediums or members might be used.

In carrying my invention into effect I find it advantageous to have the hexagonal resilient driving medium 26 or 27 made so that each flat section adapted to lie between a seat 14 and a seat 25 is a little thicker radially at one end than at the other, that is it will have a little more mass so that when it is forced into position between the inner and outer seats referred to, the tendency will be to throw the apexes of the inner and outer angles, that is the ends of the corresponding seats, out of radial alignment, and when the driving effort or strain is imparted, the thicker part will be first distorted radially and these parts can be calibrated so that when the final speed and power are applied the inner and outer angle apexes will radially align. For example, referring to Figure 1 it will be seen that each of the flat parts of the member 27 will be thicker at the end $a$ than at the end $b$, and with the member 26 the arrangement will be exactly opposite, that is to say while the two members 26 and 27 will be shaped exactly alike, one will be put on one way and the other the directly opposite way, so that the thicker and thinner parts on the two members would be oppositely arranged, and the seat portions 14 for the two members can be slightly differently sloped to accommodate this position. This will be understood by reference to Figure 1. This shows the member 27 between the seats 14 and 25, and as the left hand end of each flat part of the member 27 is a little thicker than the opposite end $b$, it will be seen that when forced into position the apexes of opposed angles $e$ and $d$ will not radially align, and if the driving member is turned clockwise, the greater pressure will be first applied through the thicker ends $a$ which will gradually be distorted. The initial or inner base of each flat member of the medium 27 is represented by the broken line 28 in Figure 1. Now as the driving pressure is applied it will gradually compress the material of the driving member until at the point of maximum pressure the parts $e$ and $d$ align, this position being shown by full line 29, this line representing the working position of the driving member. The adjacent member 26 will have the angles in the directly opposite position. For example the initial position of the seats for the second driving member are represented by the broken line 30 in Figure 1, and so when the driving member is turned in the opposite direction from that first referred to, the action is the same as above described except that it takes place through a different member 26.

Obviously if the members 26 and 27 were of uniform thickness throughout, they would still have the desired resiliency and the easy driving effect, but this effect is enhanced and bettered by giving the driving media 26 and 27 the shape referred to.

Referring more particularly to Figure 1, we will say that the driving member turns clockwise. Thus it will be seen that the parts $a$ of each flattened portion of the driving medium will be distorted, and as the movement of driving continues, it will be imparted at first slowly through the driving medium to the driven member, represented by the seats 25, and the continued effort further distorts the mass of the driving medium until the seats 14 and 25 are substantially parallel, after which the driving and driven parts move as if they were solidly connected.

The object of having the plurality of members 26 and 27 with their flattened portions slightly differently pitched is simply to facilitate the movements either clockwise or anti-clockwise. As shown, therefore, it will be seen that whether the driving member is turned one way or the other, the driving effort is through a continuous resilient member disposed between co-acting seats, and thus the starting strain is eliminated and no shock results from starting.

It will be further noticed that the arrangement shown of the driving medium results in a gradual speed and power changing effect, as well as in the resilient result, because it will be noticed that when movement of the driving member is first imparted, it will be before the maximum torque of the driving medium has taken place, and thus the power will be applied at one radial position of the two members, and that this position gradually changes, moving outward until the driving and driven members move at the same speed.

In Figures 3 and 4 I have shown the invention slightly modified to adapt it to other types of wheels, and to a wheel of what is known as a full floating type. In this case the axle 10 is shown extending through a conventional full floating sleeve 31 which is mounted in a wheel 32, here illustrated as of the artillery type, and the wheel is shown with a conventional brake drum 33. The usual standard bearings 34 are placed between the wheel and the floating axle sleeve 31. My invention can be readily applied to this type of wheel, whether it is a new wheel or an old one, and this is clearly shown in Figure 4. Here the sleeve member 11' is keyed to the axle as already described, and it is provided with the seats 14 as already referred to, and with a housing 35 having co-acting seats 25 spaced from the seats 14 as referred to above. The resilient members 26 and 27 are also arranged between the outer and inner seats precisely as already described, except that I have shown a disc 36 between the seats to prevent them from cohering. This I find advantageous. The housing has a flange 37 between which and the member 11' is a bearing 38, and the flange 37 is screw threaded to receive a cap nut 39, as the drawing shows. The whole hub structure is fastened to the wheel and brake drum by bolts 40, and it will be seen that by removing the nuts 39 or 13 and removing the nuts from the bolts 40, the hub part embodying the flexible driving mechanism can be taken off, and that it can be as easily applied. Obviously it might be attached in other ways to other types of wheels and axles without affecting the invention.

From the description given the action of my driving mechanism will be fully understood, and it will also be seen that the particular construction of the driving and driven members can be greatly changed without affecting the invention, and that the essential thing is to have the spaced apart seats on the driving and driven members, which co-act through the medium of the non-metallic connecting resilient mass. If the seats are arranged in this way so that the collar or body of resilient non-metallic material can be placed between them and the entire driving freely passed through such medium, then the desired result is attained, and it will be evident that the detail structure can be varied greatly. It is desirable, however, to have the member 26 or the plural members 26 and 27 housed in and held as illustrated against any lateral distortion so that the driving effort will be certainly and effectively transmitted from the resilient driving material to the driven member.

I claim:—

1. A flexible driving mechanism comprising a rotary driving member having circumferential flat seats thereon, a rotary driven member spaced from and encircling the driving member and having seats corresponding to those of the driving member, and a plurality of continuous resilient bodies filling the space between the seats of the driving and driven members with the flattened parts of each resilient body thicker at one portion than at another and with the alternating resilient bodies oppositely placed.

2. A flexible driving mechanism comprising a rotary driving member having a raised portion with flattened seats thereon, a rotary driven member spaced from and encircling the driving member and fitting over the raised part of the driving member, bearings between the driving and driven members on opposite sides of the raised part of the driving member, and a continuous resilient body contained in the driven member and fitting against the seats of the driving and driven members.

3. A flexible driving mechanism comprising a rotary driving member having circumferential seats, a rotary driven member spaced from the driving member and having seats radially opposed and coacting with the seats of the driving member, reslient bodies filling the space between the seats of the driving and driven members, and a non-resilient body between the resilient bodies.

4. A flexible driving mechanism comprising a rotary driving member having circumferential flat seats thereon, a rotary driven member spaced from and encircling the driving member and having seats corresponding to those of the driving member, a plurality of continuous resilient bodies filling the space between the seats of the driving and driven members with the flattened parts of each resilient body thicker at one portion than at another and with the alternating resilient bodies oppositely placed, and a non-resilient body between the resilient bodies.

In testimony whereof, I have signed my name to this specification this 18th day of January, 1928.

FREDERICK WILLIAM BAKER.